United States Patent Office 3,564,057
Patented Feb. 16, 1971

3,564,057
PRODUCTION OF ALKANOLAMINES
John B. Tindall, Terre Haute, Ind., assignor to Commercial Solvents Corporation, New York County, N.Y., a corporation of Maryland
No Drawing. Filed Oct. 7, 1968, Ser. No. 765,653
Int. Cl. C07c 85/10
U.S. Cl. 260—584                                            7 Claims

ABSTRACT OF THE DISCLOSURE

An improved process for the production of primary alkanolamines by the reduction of nitroalkanols whereby the content of N-alkylated alkanolamines is substantially reduced, by effecting the reduction step in the presence of ammonia or a soluble primary or secondary aliphatic amine.

BACKGROUND OF THE INVENTION

This invention relates to an improved process for the production of primary alkanolamines. In a particular aspect, it relates to the production of primary alkanolamines having a reduced content of N-alkylated alkanolamines.

Primary alkanolamines having from 1 to 3 hydroxy groups in the molecule are conveniently produced by reduction (hydrogenation) of the corresponding nitroalkanols in the presence of a hydrogenation catalyst at elevated temperatures and pressures.

The nitroalkanols are prepared by the condensation of a nitroalkane with formaldehyde in an aqueous-alcohol solution in the presence of an alkaline catalyst, as is known in the art. An excess of as much as 10 mole percent formaldehyde over the stoichiometric amount is generally used to insure a complete conversion of the nitroalkane, inasmuch as the reaction tends to be reversible in the presence of the alkaline catalyst. The nitroalkanol is usually not recovered from solution when it is to be converted to the alkanolamine, because of the high losses of product which would ensue, and no practical method is available for removing the excess formaldehyde, which as a consequence, is present in the mixture intended for reduction.

It was long believed that the formaldehyde present in the mixture was innocuous because it was supposed that it would be reduced to methanol early in the reaction period. However, long-standing problems relating to bad odor of the alkanolamines and to dark colored derivatives, e.g. oxazolines, were traced to the presence in the alkanolamines of as much as 5–10% wt. of the N-methyl derivative. These secondary alkanolamines are very difficult to separate from their primary homologs and available purification procedures are too expensive for most applications. The formation of these N-methyl derivatives has been found to result from the reaction of the free formaldehyde with the freshly produced alkanolamine in the hydrogenation mixture where it alkylates the amino group.

SUMMARY OF THE INVENTION

It is an object of this invention to provide an improved process for the production of primary alkanolamines.

It is another object of this invention to provide primary alkanolamines having improved odor and suitable for the preparation of derivatives having improved color.

It is still another object of this invention to provide primary alkanolamines having a low ratio of the N-methyl derivative as an impurity.

Other objects will be apparent to those skilled in the art from the disclosure herein.

It is the discovery of this invention that in the process for the production of primary alkanolamines by the reduction of the corresponding nitroalkanol, that the ratio of secondary to primary alkanolamines is reduced by effecting the reduction in the presence of ammonia or a soluble primary or secondary aliphatic amine.

DETAILED DISCUSSION

The improved process of this invention is applicable to the production of primary alkanolamines by reduction of the corresponding nitroalkanols, including but not limited to, tris(hydroxymethyl)nitromethane, 2 - nitro-2 - methyl - 1 - propanol, 2 - nitro - 2 - methyl - 1,3-propanediol, and 2 - nitro - 2 - ethyl - 1,3 - propanediol, as well as nitroalkanol derivatives of the nitropentanes and nitrohexanes. It is not intended that the improved process of this invention be limited to the reduction of only these nitroalkanols since it will be apparent from the disclosure herein that the process can be employed for the reduction of any nitroalkanol in the presence of free formaldehyde.

The nitroalkanol is received from the condensation step in the form of an aqueous solution containing free formaldehyde and usually some alcohol, e.g. methanol or ethanol, but the alkaline catalyst usually has been removed. The formaldehyde content is determined by any suitable means, many of which are known, and there is mixed with the solution from 1 to about 5.0, preferably 2–4, molar equivalents of ammonia or, preferably, a soluble primary or secondary aliphatic amine per mole of formaldehyde.

The ammonia or amine can be mixed with the nitroalkanol solution by any convenient means, and it is intended that the process not be limited by the mixing step. Whether the process is batch or continuous, the ammonia or amine can be added as an aqueous or alcoholic solution, or can be added as anhydrous; whichever form is most convenient will be the form generally preferred. The ammonia or amine can be added prior to the reduction step, or, if the process is a continuous one, it can be delivered simultaneously and proportionately to the reaction zone. If the reduction is to be effected in a batch process in a hydrogenation vessel, e.g. an autoclave, the ammonia or amine can be conveniently dissolved in a suitable volume of water, or a water-alcohol mixture, placed in the reaction vessel and the nitroalkanol added thereto.

Sponge nickel catalyst is then added to the reaction mixture and the nitroalkanol is reduced by hydrogenation to the alkanolamine under reduction conditions according to methods known to those skilled in the art.

When the reaction is complete, the reaction mixture is cooled, filtered and delivered to a distillation unit where the alcohol, if any, water, mono- and dimethyl alkylamines formed by reaction of the primary or secondary amine with the excess formaldehyde, and any excess of the added aliphatic amine, are removed by distillation. The residual alkanolamine can then be used as is or can be purified by any suitable means, several of which are known.

The preferred amines suitable for use in the parctice of this invention can be any of the aliphatic primary and secondary amines miscible with the reaction mixture under the reaction conditions and reactable with formaldehyde under the reaction conditions. It is apparent that a high degree of water solubility is not necessary, particularly since some methanol is usually present, but sufficient solubility to provide a single phase reaction mixture is preferred. The term soluble amine is intended to mean that the amine is soluble to the extent that it is present in the reaction mixture at the reaction temperature. Generally the volatile and medium-boiling amines, e.g. those having a boiling point of about 150° C. or less at atmospheric pressure, are preferred for ease of removal after reduction of the nitroalkanol is complete. Also, the primary amines are generally preferred to the secondary. Amines having from 1 to about 8 carbon atoms generally fulfill these preferred criteria, but the lower molecular weight amines having from 1 to 4 carbon atoms are preferred to the higher molecular weight ones. Monomethylamine is a particularly preferred amine.

The following examples further illustrate the practice of this invention but it is not intended to be limited thereby.

EXAMPLE 1

A solution of 2-nitro-2-methyl-1-propanol (NMP), determined to contain 0.25 mole per liter of formaldehyde, was received from the nitroalkeneformaldehyde condensation unit. A 350 ml. portion of this solution (containing 2.18 mol of NMP and 0.087 mol of formaldehyde) was reduced incrementally in a rocking bomb in the presence of 400 ml. of methanol and 10 g. of Raney nickel catalyst at a temperature of 70° C. and a pressure of 600 p.s.i.g. hydrogen pressure. When hydrogen was no longer being consumed, the product from the bomb was filtered and fractionated. The product cut, 2-amino-2-methyl-1-propanol, was collected at 92° C. at 40 mm.

A second run was made in the same manner except that 0.204 mol of monomethylamine was added to the methanol in the bomb before the run was started, providing a ratio of about 2.3 moles per mole of formaldehyde.

The products were analyzed by nuclear magnetic resonance and had the following composition:

Monomethylamine added—none, 0.204 mol
2-amino-2-methyl-1-propanol, mol percent—94.2, 98.6
2-monomethylamino-2-methyl-1-propanol, mol percent— 5.8, 1.4.

The product prepared in the presence of the monomethylamine was much improved in odor. It was employed in the preparation of an oxazoline by condensing with a mono-carboxylic organic acid. The resulting product had an improved color over that previously obtained.

EXAMPLES 2–3

Three portions of 306 g. each of an aqueous solution containing 131 g. (0.97 mole) of pure 2-nitro-2-methyl-1,3-propanediol and 0.08 mole of formaldehyde per each portion were mixed with 400 ml. of methanol and 10 g. of Raney nickel catalyst each. Monomethylamine, 0.4 mole, was added to one portion, and dimethylamine, 0.4 mole, was added to the second. The third was free from amine as a control. The mole ratio of amine to formaldehyde was 5:1. The mixtures were reduced incrementally in rocking bombs at 70° C. and at 600 p.s.i.g. hydrogen pressure.

When the reduction was complete, the products from the bombs were filtered and concentrated to remove methanol, volatile amines and amino alcohols. The residues had the following compositions as determined by nuclear magnetic resonance.

|  | Control | Example No. 2 | Example No. 3 |
|---|---|---|---|
| Amine added | None | $CH_3NH_2$ | $(CH_3)_2NH$ |
| 2-amino-2-methyl-1,3-propanediol, mol percent | 88.8 | 97.2 | 96.0 |
| 2-methylamino-2-methyl-1,3-propanediol, mol percent | 11.2 | 2.8 | 4.0 |
| Odor | Unpleasant | Mild | Mild |

EXAMPLES 4–5

Three portions of 296 g. each of a solution containing 48.7% 2-nitro-2-ethyl-1,3-propanediol, 33.8% of water, 16.6% methanol and 0.9% of formaldehyde (0.089 mole) were transferred to rocking bombs containing 10 g. of Raney nickel catalyst and 400 ml. of methanol each. To each of two of these was added 0.2 mol of amine, as noted below, to provide a mole ratio of about 2.2 moles of amine per mole of formaldehyde. The temperature was held at 70° C. and the hydrogen pressure was 600 p.s.i.g.

The reaction products were filtered and distilled to remove methanol. The residues were analyzed by nuclear magnetic resonance to determine the amount of 2-monomethyl-amino-2-ethyl-1,3-propanediol (MMAEPD).

|  | Control | Example No. 2 | Example No. 3 |
|---|---|---|---|
| Amine used | None | $CH_3NH_2$ | $(CH_3)_2NH$ |
| MMAEPD, mol percent | 9.1 | 1.6 | 1.2 |
| Odor | Unpleasant | Mild | Mild |

EXAMPLES 6–7

The experiment of Examples 2–3 is repeated except that tris(hydroxymethyl)nitromethane is substituted for 2-nitro-2-methyl-1,3-propanediol. The product obtained contains only a small proportion of the N-monomethyl derivative as an impurity and has a mild odor.

EXAMPLES 8–9

The experiment of Examples 2–3 is repeated except that ethylamine and diethylamine are substituted for methylamine and dimethylamine respectively. In each case, the product obtained contains only a small proportion of the N-monomethyl derivative as an impurity and has a mild odor.

EXAMPLES 10–11

The experiment of Examples 2–3 is repeated except that propylamine and dipropylamine are substituted for methylamine and dimethylamine respectively. In each case the product obtained contains only a small proportion of the N-monomethyl derivative as an impurity and has a mild odor.

EXAMPLE 12

The experiment of Example 1 is repeated except that 2-nitro-1-butanol is substituted for 2-nitro-2-methyl-1-propanol. The product obtained contains only a small proportion of the N-monomethyl derivative as an impurity and has a mild odor.

EXAMPLE 13

The experiment of Example 1 is repeated except that 2-nitro-1-ethanol is substituted for 2-nitro-1-butanol. The product obtained contains only a small proportion of the N-monomethyl derivative as an impurity and has a mild odor.

EXAMPLE 14

The experiment of Example 1 is repeated except that ammonia is substituted for monomethylamine. The product obtained contains only a small proportion of the N-monomethyl derivative as an impurity and has a mild odor.

What is claimed is:

1. In a process for the production of a primary alkanolamine by the reduction of the corresponding nitroalkanol in the presence of formaldehyde under reducing conditions, the improvement comprising effecting the reduction step in the presence of ammonia or a soluble primary or secondary aliphatic amine having from 1 to 8 carbon atoms and a boiling point of 150° C. or less in a mole ratio of from 1–5:1 of said formaldehyde and recovering said alkanolamine.

2. The process of claim 1 wherein the amine is a secondary amine having from 2 to about 8 carbon atoms.

3. The process of claim 1 wherein the amine is monomethylamine.

4. The process of claim 1 wherein the amine is dimethylamine.

5. The process of claim 1 wherein the nitroalkanol is 2-nitro-1-ethanol, 2-nitro-2-methyl-1-propanol, 2-nitro-1-butanol, 2-nitro-2-methyl-1, 3-propanediol, 2-nitro-2-ethyl-1,3-propanediol, or tris(hydroxymethyl)nitromethane.

6. The process of claim 1 wherein the reduction step is conducted in the presence of ammonia.

7. The process of claim 1 wherein the ammonia or amine is present in a mole ratio of from 2–4 per mole of formaldehyde.

References Cited

UNITED STATES PATENTS 3,366,686  1/1968  Rosenthal et al. __ 260—583(M)
3,391,197  7/1968  Frump _____ 260—584X JOSEPH P. BRUST, Primary Examiner R. L. RAYMOND, Assistant Examiner U.S. Cl. X.R.

260—583